J. C. MAPLE.
Rein-Holder.

No. 209,766.  Patented Nov. 12, 1878.

Attest:
Fred Benjamin
E. H. Welsh

Inventor:
J. C. Maple
By his attorney
Charles E. Foster

UNITED STATES PATENT OFFICE.

JACOB C. MAPLE, OF TRENTON, NEW JERSEY, ASSIGNOR TO W. S. MANLEY.

IMPROVEMENT IN REIN-HOLDERS.

Specification forming part of Letters Patent No. 209,766, dated November 12, 1878; application filed April 20, 1878.

*To all whom it may concern:*

Be it known that I, JACOB C. MAPLE, of the city of Trenton, Mercer county, New Jersey, have invented Improvements in Rein-Holders, of which the following is the specification:

My invention is a rein-holder constructed, as fully described hereinafter, so as to be readily adjusted upon the rein, firmly secured after adjustment, and affording a comfortable bearing for the hand, and to prevent the rein from slipping through the hand.

Figure 1:
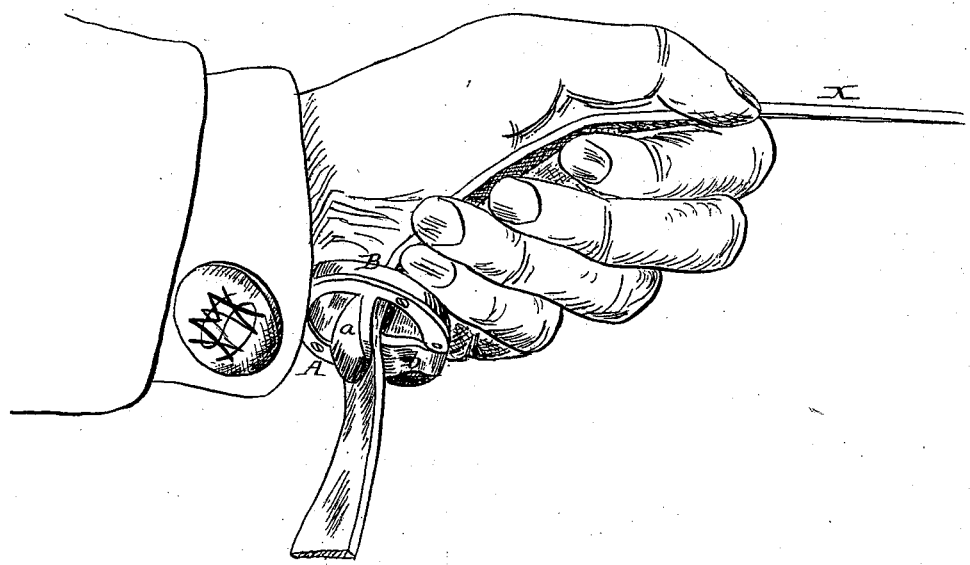
Figure 3:
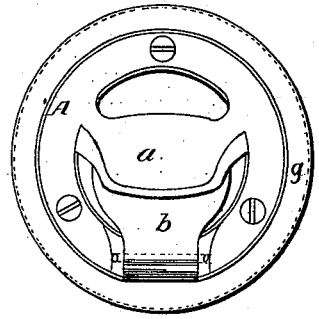
Figure 2:
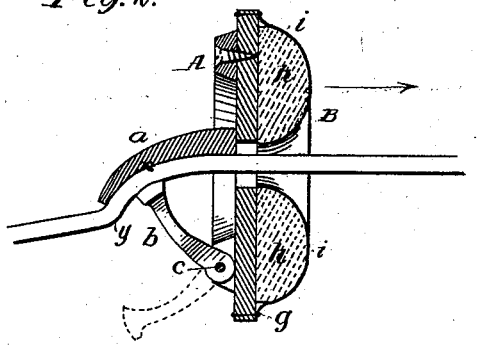

In the accompanying drawing, which forms part of this specification, Figure 1 is a perspective view, showing my improved rein-holder; Fig. 2, a transverse section, and Fig. 3 a rear view.

A ring or frame, A, has at one side a projecting lip or extension, $a$, and below the latter is divided, or otherwise constructed to receive the pivoted end of a dog, $b$, turning on a pin, $c$, extending across the opening in the frame. The strap X is passed between the lip $a$ and dog $b$, and the device is adjusted at any suitable point by carrying it in the direction of the arrow, Fig. 2, the dog yielding and falling to the position shown in dotted lines.

When the device has been arranged at the proper point upon the strap, the dog is turned upward and the strap is clamped between the end of the dog and the under side of the lip $a$, which is at such an angle to the circle described by the end of the dog that the latter, as the dog swings inward, approaches the lip and gripes the strap in proportion to the extent to which it is turned and according to the thickness of the strap.

As any draft upon the rein, Fig. 2, tends to draw the dog inward, such draft only clamps the device more firmly to the strap, so that a firm, unyielding bearing for the hand is obtained, while the device may be instantly released or adjusted at any time by turning down the dog $b$, which is done by merely drawing the strap back.

It will be noticed that the under side of the lip $a$ is curved at $x$ near the outer end, so that the strap is bent into this curved portion by the action of the dog, causing an abrupt bend at $y$, which materially aids in securing a firm hold upon the rein.

Although the device may be used in the form described, I prefer to provide the frame at the front with a cushion, B, which serves to form a more comfortable bearing for the hand than would the metal frame. This cushion may be made of any suitable material. I prefer, however, to use a disk, $g$, of leather, fastened to the ring, and having at the front side a suitable packing, $h$, secured by a leather covering, $i$, stitched to the disk. The device may, in some instances, be made of rubber or other suitable material; and, instead of having a cushion of soft material at the front, the whole device may be cast, formed, or molded in one piece, with a rounded front corresponding in shape to that of the front of the cushion B.

I claim—

1. A rein-holder consisting of a plate or frame, A, provided with a lip or projection, $a$, and with a pivoted dog, $b$, between which and the lip the rein may be griped, substantially as set forth.

2. The plate A, provided with the lip and dog, and having an annular rounded face, B, as set forth.

In testimony whereof I have signed my name to this specification in the presence of two subscribing witnesses.

JACOB C. MAPLE.

Witnesses:
 C. D. WATERS,
 THEO. C. MAPLE.